United States Patent [19]

Lane et al.

[11] 4,412,931

[45] Nov. 1, 1983

[54] REVERSIBLE PHASE CHANGE COMPOSITIONS OF CALCIUM CHLORIDE HEXAHYDRATE WITH A POTASSIUM SALT

[75] Inventors: George A. Lane; Harold E. Rossow, both of Midland, Mich.

[73] Assignee: The Dow Chemical Company, Midland, Mich.

[21] Appl. No.: 417,275

[22] Filed: Sep. 13, 1982

[51] Int. Cl.³ ............................................. C09K 5/06
[52] U.S. Cl. ................................. 252/70; 423/497; 423/421; 423/551
[58] Field of Search ........................................ 252/70

[56] References Cited

U.S. PATENT DOCUMENTS 3,495,953  2/1970  Gaska et al. ......................... 23/308
3,498,758  2/1970  Gaska et al. ......................... 23/296

FOREIGN PATENT DOCUMENTS 53-19183  2/1978  Japan.
568669    9/1977  U.S.S.R. .

*Primary Examiner*—John E. Kittle
*Assistant Examiner*—Robert A. Wax

[57] ABSTRACT

A reversible liquid/solid phase change composition comprising a mixture of hydrated $CaCl_2$ and a potassium salt whose anion forms a substantially less soluble salt with calcium and in which the potassium salt modifies the semi-congruently melting behavior of $CaCl_2.6H_2O$ to the extent that the mixture approaches congruent melting behavior. Preferred examples of such compositions are $CaCl_2$ admixed with potassium sulfate, potassium carbonate or potassium phosphate. The composition preferably includes nucleating additives to modify and suppress the supercooling properties of the liquid phase of the composition. The composition is adapted to be incorporated into an encapsulating means for use as a heat storage device.

31 Claims, No Drawings

REVERSIBLE PHASE CHANGE COMPOSITIONS OF CALCIUM CHLORIDE HEXAHYDRATE WITH A POTASSIUM SALT

BACKGROUND OF THE INVENTION

The invention relates to reversible liquid/solid phase change compositions. More particularly, the invention resides in phase change compositions comprising a mixture of hydrated calcium chloride and a potassium salt whose anion forms a substantially less soluble salt with calcium.

Phase change materials (PCM's) in which the heat of fusion of various hydrated salt compositions is employed are well known in the literature. In the ASHRAE Journal of September, 1974, entitled SOLAR ENERGY STORAGE, Dr. M. Telkes evaluated the thermal, physical and other pertinent properties of PCM's on the basis of economics, applicability, corrosion, toxicity and availability for large scale installations. Among the materials evaluated were various salt hydrates and their eutectics including $CaCl_2.6H_2O$ which undergoes several phase transitions to materials of different crystal structure, i.e. $CaCl_2.6H_2O$ to $CaCl_2.4H_2O + 2H_2O$ at 29° C.

When heated to a temperature of above 33° C., the salt $CaCl_2.6H_2O$ dissolves completely in its water of crystallization. When cooled, formation of four different crystal forms is possible, i.e., $CaCl_2.6H_2O$ and three forms of $CaCl_2.4H_2O$. If any of the $4H_2O$ crystals form, the heat of fusion is much less than 46 cal/gm ($CaCl_2.6H_2O$ in substantially pure form undergoes a liquid/solid phase transition at about 30° C. releasing or alternately absorbing about 46 calories of heat per gram). Despite the relatively low cost of $CaCl_2$, the formation of its four different crystal forms was deemed to be disadvantageous.

Carlsson et al., in Swedish Pat. No. 78,01037-8 (Publication No. 410,004), claim a method for suppressing the tetrahydrate formation during repeated melting and crystallization of a system based on $CaCl_2.6H_2O$. Carlsson et al., determined that in solutions in the concentration range of from 48 to 53 weight percent $CaCl_2$, using $CaCl_2.6H_2O$ of highest purity, the crystallization temperatures for $CaCl_2.6H_2O$ and $CaCl_2.4H_2O$ were such that the solution was incongruently melting and that $CaCl_2.4H_2O$ crystallized and precipitated out of the solution thus losing its heat storage capacity. By using a solution of the same concentration from $CaCl_2$ of technical grade (Road Salt), containing NaCl and KCl as impurities, the solubility of the tetrahydrate decreased and that of the hexahydrate increased. However, on repeated melting and crystallization, the precipitation becomes significant and the system again loses its heat storage capacity. Thus, the conclusion can be drawn that the use of technical grade $CaCl_2$ (Road Salt) results in a poorer performance due to a relative increase in tetrahydrate formation as compared to a system based on high purity $CaCl_2$.

Carlsson et al., also discovered that the addition of one or more compounds, including about 2 weight percent $SrCl_2.6H_2O$, increased the solubility of the tetrahydrate and suppressed tetrahydrate formation on repeated melting and crystallization. The amount of addition was found to be dependent upon the amount of impurities present in the system which, in an example using Road Salt was determined to be 2.2 weight percent.

The relative amounts of each impurity in the technical grade salt (Road Salt) was not determined nor was it held to be important to the outcome of the tests conducted. In fact, the use of Road Salt was found to be less desirable from the standpoint of tetrahydrate formation compared to $CaCl_2$ of high purity. Neither was there any recognition by Carlsson et al., that impurities of NaCl and KCl in the composition could be beneficial in reducing tetrahydrate crystal formation in such phase change compositions.

In our copending U.S. application Ser. No. 364,159, filed Mar. 31, 1982, it was shown that the addition of KCl to $CaCl_2.6H_2O$ greatly reduces the possibility of forming the undesired $CaCl_2.4H_2O$ crystalline phase during the retrieval of the stored heat on freezing of the phase change composition. The present invention now surprisingly shows that the desirable effect of reducing the formation of the undesired $CaCl_2.4H_2O$ crystalline phase can also be achieved with salts other than the chloride, i.e., KCl. In particular, the reduction of the formation of the $CaCl_2.4H_2O$ crystalline phase during the retrieval of stored heat on freezing of the hydrated $CaCl_2$ composition can be achieved by the addition of a potassium salt in which the anion of the potassium salt employed forms a sparingly soluble calcium salt, i.e., a calcium salt which is substantially insoluble.

Our copending U.S. application Ser. No. 364,159 also shows that the addition of NaCl and/or $SrCl_2$ augments the beneficial effect produced by the addition of KCl to the hydrated $CaCl_2$ composition to thereby obtain a composition which is an effectively congruently melting composition. It has now been discovered that other sodium and/or strontium salts can also be employed with the same beneficial results.

In some applications, for example, it is preferable to use potassium, sodium or strontium salts or mixtures of such salts, other than salts in which the anion is chloride, to increase the pH of the composition and to thereby reduce the natural acidity of aqueous $CaCl_2$. In systems, i.e., phase change compositions in which the anions of potassium, sodium and strontium salts form a substantially less soluble salt with calcium, the compatibility of the heat storage composition in metal containers is substantially improved.

Heat storage compositions are ideally packaged in individual encapsulating means for use in conjunction with solar heating systems. Exemplary of suitable known encapsulating means for the heat storage compositions herein described are water impervious films or foils of plastic/metal laminates. Closed cell plastic foams have also been suggested in which the PCM may be encapsulated within the cells of the foam structure as illustrated in, for example, U.S. Pat. No. 4,003,426. Other useful encapsulating means are concrete, metal or plastic containers, pipes, and the like.

SUMMARY OF THE INVENTION

The invention resides in a reversible liquid/solid phase change composition comprising an admixture of hydrated $CaCl_2$ and a potassium salt whode anion forms a substantially less soluble salt with calcium, wherein the potassium salt is added in an amount sufficient to modify the semi-congruent melting behavior of $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$.

The invention also relates to a reversible liquid/solid phase change composition comprising a mixture of $CaCl_2.6H_2O$ and a potassium salt, whose anion forms a substantially less soluble salt with calcium, wherein the potassium ion is present in an amount sufficient to modify the semi-congruent melting behavior of $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$, and a reversible liquid/solid phase change composition comprising a mixture of $CaCl_2.6H_2O$ and a potassium salt whose anion forms a substantially less soluble salt with calcium, wherein the potassium ion is present in an amount sufficient to modify the semi-congruent melting behavior of $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$, and including a salt selected from the group consisting of sodium and strontium salts, wherein the anion of said sodium and/or strontium salt forms a substantially less soluble salt with calcium, said sodium and/or strontium salt being present in an amount sufficient to modify the $CaCl_2.6H_2O$ and potassium salt mixture to form an effectively congruently melting mixture.

The invention also relates to a heat storage device comprising an encapsulating means having a reversible liquid-solid phase change composition hermetically sealed in said encapsulating means to prevent evaporation of water from the composition, said composition comprising an admixture of hydrated $CaCl_2$ and a potassium salt whose anion forms a substantially less soluble salt with calcium, wherein the potassium salt is added in an amount such that the potassium ion is present in an amount sufficient to modify the semi-congruent melting behavior of $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$.

The invention also relates to a method of storing heat, comprising the steps of preparing a reversible liquid-solid phase change composition by admixing hydrated $CaCl_2$ and a potassium salt whose anion forms a substantially less soluble salt with calcium, adding said potassium salt in an amount sufficient such that the potassium ion is present in an amount sufficient to modify the semi-congruent melting behavior of $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$, introducing the composition into an encapsulating means for use as a heat storage device, and hermetically sealing the encapsulating means to prevent evaporation of water from the composition.

Although the hydrated $CaCl_2$/potassium salt mixture of the invention surprisingly reduces the formation of crystal forms other than the hexahydrate form, it was found that it still retained the inherent characteristics of the supercooling properties of $CaCl_2.6H_2O$. Accordingly, the present invention preferably provides for the addition of select nucleating agents in order to effectively reduce supercooling in the hydrated $CaCl_2$/potassium salt system.

The avoidance of supercooling during the crystallization of hydrated $CaCl_2$, as by the addition of various nucleating agents, is generally known in the literature from, for example, U.S.S.R. Inventorship Certificate No. 568,669, granted Mar. 3, 1975; Japanese Pat. No. 969,909, granted Aug. 31, 1979; and U.S. Pat. No. 4,189,394. However, nucleating agents were not intended as additives to achieve congruently melting salt hydrates.

Although the addition of a potassium salt in which the anion is present in an amount sufficient to effectively reduce the tendency of the phase change composition to form, on freezing, the undesired $CaCl_2.4H_2O$ phase, even a maximum amount present at the solubility limit is not sufficient to completely prevent the formation of $CaCl_2.4H_2O$. Accordingly, in a preferred embodiment of the invention, the formation of $CaCl_2.4H_2O$ can be totally prevented from crystallizing if the potassium salt is used in combination with a sodium and/or strontium salt in which the anion forms a substantially less soluble salt with calcium.

DETAILED DESCRIPTION OF THE INVENTION

The present invention represents a significant improvement towards the goal of developing an inexpensive yet highly effective reversible liquid/solid phase change composition based on hydrated $CaCl_2$ in admixture with a potassium salt.

Hydrated salt change materials exhibit three general types of phase/change behavior: congruent, semi-congruent and incongruent melting. The most desirable behavior is congruent melting which occurs when the solid phase change composition (ratio of salt to bound water) is the same as liquid phase compositon. In that case, the hydration/dehydration process appears identical to the melting and freezing process.

The term "effectively congruently melting mixture" herein used defines a mixture of ingredients, based on aqueous calcium chloride, for which, at the melting point, solid and liquid phases are in stable equilibrium: the solid phase containing no hydrated calcium chloride material other than the hexahydrate or solid solutions thereof; and the liquid phase containing, for every mole of calcium chloride, six moles of water, plus sufficient water to form the stable hydrate of any additive materials in solution.

Semi-congruent melting occurs when a phase change material has two or more hydrate forms with differing solid compositions and melting points. The material can be transformed into other hydrate forms before either complete melting or freezing occurs, resulting in a broadened melting point range. In addition, there is a temporary loss in thermal storage capacity. Calcium chloride hexahydrate is an example of a semi-congruently melting phase change material.

Incongruently melting phase change materials yield two distinct phases upon melting: a saturated solution and a precipitate of an insoluble anhydrous salt. If the precipitate settles out of the solution, the anhydrous salt will not hydrate completely upon cooling and some thermal storage capacity will be lost with each freezing- /melting cycle. Incongruent melting, as observed with sodium sulfate decahydrate, for example, is a more serious problem because it can result in a continual loss of latent heat storage capacity.

The term "supercooling" refers to a discrepancy between the temperature at which freezing initiates and the melting temperature of a given liquid/solid phase change material when cooled and heated under quiescent conditions.

The term "additives" includes, in addition to nucleating agents such as have been specified hereinbelow, precursors of such additives which are non-detrimental to the function of the phase change materials of the invention. More particularly, the additives herein referred to are either anhydrous or hydrated compositions of inorganic salts or precursor materials which would form the salt upon addition to hydrated calcium chloride.

The composition of the invention basically comprises a mixture of from about 37 to about 51 weight percent $CaCl_2$ and from about 0.5 to about 23 weight percent potassium salt, with the balance being $H_2O$ (in an amount up to 100 weight percent). Examples of potassium salts are the following: potassium arsenate; potassium metaborate; potassium citrate; potassium fluoride; potassium hydroxide; potassium molybdate; potassium oxalate; potassium metaphosphate; potassium pyrophosphate; potassium silicate; potassium sulfite, and potassium tartrate.

Of the above listed potassium salts, potassium sulfate, potassium carbonate, and potassium phosphate are preferred. These salts are present in a composition in which the $CaCl_2$ comprises from about 37 to about 51 weight percent. The potassium sulfate is admixed with the $CaCl_2$ in an amount of from about 0.5 to about 19 percent by weight; the potassium carbonate is admixed with the $CaCl_2$ in an amount of from about 0.5 to about 15 percent by weight, and the potassium phosphate is admixed with the $CaCl_2$ in an amount of from about 0.5 to about 23 percent by weight, the balance in each instance being water in an amount of up to 100 percent by weight.

Examples of most preferred phase change compositions are the following:

$CaCl_2$—from about 47.1 to about 50 weight percent
$K_2SO_4$—from about 8.4 to about 10.8 weight percent
$H_2O$—Balance of up to 100 weight percent
$CaCl_2$—from about 47.5 to about 50 weight percent
$K_2CO_3$—from about 8.7 to about 10.6 weight percent
$H_2O$—Balance of up to 100 weight percent
$CaCl_2$—from about 48.5 to about 50 weight percent
$K_3PO_4$—from about 7.6 to about 9.1 weight percent
$H_2O$—Balance of up to 100 weight percent In a preferred application the phase change composition also includes the addition of a sodium and/or strontium salt to further modify the $CaCl_2.6H_2O$/potassium salt mixture to thereby obtain a composition which is effectively a congruently melting composition.

Examples of sodium and strontium salts are the following: sodium arsenate; sodium metaborate; sodium citrate; sodium fluoride; sodium hydroxide; strontium hydroxide; sodium molybdate; sodium oxalate; sodium metaphosphate; sodium pyrophosphate; sodium silicate; sodium sulfide; sodium tartrate, and strontium tartrate. Mixtures of these salts may also be employed.

It is to be understood that the above list of potassium, sodium and strontium salts are not intended to be all inclusive but that persons skilled in the art may readily substitute equivalent potassium, sodium or strontium salts in order to achieve similar beneficial results.

Effective amounts of selected nucleating agents for the hydrated $CaCl_2$/potassium salt mixture of the invention are determined by testing a given composition over repetitive phase change cycles and in a manner similar to the procedures employed in copending application Ser. No. 364,159. The nucleating agents of the copending application have been found to produce similar marked benefits in the $CaCl_2$/potassium salt system of the present invention. A nuclating agent in an amount in excess of about 2.0 weight percent of the weight of the composition does not provide any increase in benefit and, accordingly, the nucleating agent is preferably present in an amount of from about 0.005 to about 2.0 weight percent based on the total weight.

Nucleating agents which have been found to be of particular benefit in the $CaCl_2$/potassium salt mixture of the present invention are $Ba(OH)_2$, $BaO$, $BaI_2$, $BaS_2O_3$, $BaCO_3$, $BaCl_2$, $BaF_2$, $BaF_2.HF$, $Sr(OH)_2$, $SrO$, $SrCO_3$, $SrF_2$, $SrI_2$, or mixtures thereof. Nucleators selected from $BaCO_3$; $BaCl_2$; $BaO$; $Ba(OH)_2$; $BaI_2$; $BaSO_4$ $Sr(OH)_2$, $SrO$, or mixtures thereof are preferred.

Impurities may be present in the phase change composition in minor amounts of less than about 3.0 weight percent and provided that such impurities do not detrimentally affect the function of the basic hydrated $CaCl_2$/potassium salt phase change compositions of the invention which may include the hereinafter specified nucleating agents and additives such as a sodium and/or strontium salt. Impurities may include, for example, $LiCl$, $MgCl_2$, or other calcium salts such as $CaCO_3$ or $CaSO_4$.

The following examples illustrate the effectiveness of a potassium salt whose anion forms a substantially less soluble salt with calcium for suppressing the formation of unwanted hydrates in the $CaCl_2.6H_2O$/potassium salt phase change compositions of the invention.

In Example 4 of our copending application Ser. No. 364,159, it was shown that for a 6:1 mole ratio of $H_2O$:-$CaCl_2$, without additives, the tetrahydrate melts at 32.8° C. and the hexahydrate at 29.6° C. Thus, in the 3.2° C. span between these two temperatures, $CaCl_2.4H_2O$ can be crystallized during the freezing process. In the following examples, various potassium salts were added to aqueous $CaCl_2$ compositions, sufficient to saturate the solution with potassium ion, and the effect was determined on the tetrahydrate and hexahydrate melting points.

EXAMPLE 1

29.5 Grams of $K_2SO_4$ was added to 500 g of a stirred solution of 47 percent $CaCl_2$ and 53 percent $H_2O$. This first mixture was heated to 60° C., cooled slowly to 23.8° C., seeded with a crystal of $CaCl_2.6H_2O$, and allowed to come to equilibrium. A concentrate was also prepared by adding 31.9 g of $K_2SO_4$ to 569.7 g of a solution of 55 percent $CaCl_2$ and 45 percent $H_2O$ and heating to 55° C. This concentrate was added stepwise to the first mixture in 70–150 g increments, allowing equilibrium to be restablished after each increment. Before each addition, the equilibrium temperature was determined and a small sample of the liquid phase was withdrawn and analyzed. These data showed that at a molar ratio of 6:1 for the $H_2O$:$CaCl_2$, the melting point of $CaCl_2.6H_2O$ is 27.1° C. Further incremental additions of the concentrate caused the hexahydrate crystals to change to alpha tetrahydrate crystals. Data obtained from these additions showed that at a molar ratio of 6:1 for the $H_2O:CaCl_2$, the melting point of $CaCl_2.4H_2O$ is 29.0° C.

EXAMPLE 2

In the same manner as Example 1, 23 g of $K_2CO_3$ was added to 500 g of a stirred solution of 50 percent $CaCl_2$ and 50 percent $H_2O$. The concentrate contained 17.7 g of $K_2CO_3$ and 385 g of a solution of 55 percent $CaCl_2$ and 45 percent $H_2O$. The data obtained showed that at a molar ratio of 6:1 for the $H_2O:CaCl_2$, the melting point of $CaCl_2.6H_2O$ is 27.0° C. and that of $CaCl_2.4H_2O$ is 28.0° C.

EXAMPLE 3

In the same manner as Examples 1 and 2, 23.6 g of $K_3PO_4$ was added to 503.7 g of a stirred solution of 49.6 percent $CaCl_2$ and 50.4 percent $H_2O$. The concentrate contained 35.6 g of $K_3PO_4$ in 759 g of a solution of 55 percent $CaCl_2$ and 45 percent $H_2O$. The data showed that at a mole ratio of 6:1 for the $H_2O:CaCl_2$, the melting point of $CaCl_2.6H_2O$ is approximately 27.8° C. and that of $CaCl_2.4H_2O$ is 30.1° C.

Table I summarizes these experiments. They show that the addition of $K_2SO_4$, $K_2CO_3$, or $K_3PO_4$ reduces the temperature range over which $CaCl_2.4H_2O$ is stable, and thus decreases the tendency to form this undesired crystalline phase during the freezing process.

TABLE I
Effect of Potassium Salts on Calcium Chloride Hydrates[a]

| Salt | $CaCl_2.4H_2O$ m.p., °C. | $CaCl_2.6H_2O$ m.p., °C. | $CaCl_2.4H_2O$ Stable Span |
|---|---|---|---|
| none[b] | 32.8 | 29.6 | 3.2° C. |
| $K_2SO_4$ | 29.1 | 27.1 | 2.0° C. |
| $K_2CO_3$ | 28.0 | 27.0 | 1.0° C. |
| $K_3PO_4$ | 30.1 | 27.8 | 2.3° C. |

[a] 6:1 mole ratio $H_2O:CaCl_2$
[b] Not an example of this invention
m.p.—melting point

What is claimed is:

1. A reversible liquid/solid phase change composition comprising an admixture of hydrated $CaCl_2$ and a potassium salt whose anion forms a substantially less soluble salt with calcium, wherein the potassium salt is added in an amount sufficient to modify the semi-congruent melting behavior of $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$.

2. The composition of claim 1, wherein the potassium salt is added to the hydrated $CaCl_2$ such that the potassium ion is present in an amount of from about 0.2 to about 4.2 percent by weight of the composition.

3. The composition of claim 1, comprising an admixture of from about 37 to about 51 weight percent $CaCl_2$ and from about 0.5 to about 26 weight percent of the potassium salt, with the balance being $H_2O$ (up to 100 weight percent).

4. The composition of claim 1, wherein the potassium salt is selected from the group consisting of potassium sulfate; potassium carbonate; potassium phosphate; potassium arsenate; potassium metaborate; potassium citrate; potassium fluoride; potassium hydroxide; potassium molybdate; potassium oxalate; potassium metaphosphate; potassium pyrophosphate; potassium silicate; potassium sulfite, and potassium tartrate.

5. The composition of claim 4, wherein the potassium salt is potassium sulfate, potassium carbonate or potassium phosphate, or mixtures thereof.

6. The composition of claim 4, wherein the potassium salt is $K_2SO_4$, and the composition comprises from about 37 to 51 weight percent $CaCl_2$, from about 0.5 to about 19 weight percent $K_2SO_4$, with the balance being $H_2O$ (up to 100 weight percent).

7. The composition of claim 6, preferably comprising from about 47 to about 50 weight percent $CaCl_2$, from about 8.4 to about 10.8 weight percent $K_2SO_4$, with the balance being $H_2O$ (up to 100 weight percent).

8. The composition of claim 4, wherein the potassium salt is $K_2CO_3$, and the composition comprises from about 37 to about 51 weight percent $CaCl_2$, from about 0.5 to about 15 weight percent $K_2CO_3$, with the balance being $H_2O$ (up to 100 weight percent).

9. The composition of claim 8, preferably comprising from about 47 to about 50 weight percent $CaCl_2$, from about 8.7 to about 10.6 weight percent $K_2CO_3$, with the balance being $H_2O$ (up to 100 weight percent).

10. The composition of claim 4, wherein the potassium salt is $K_3PO_4$, and the composition comprises from about 37 to about 51 weight percent $CaCl_2$, from about 0.5 to about 23 weight percent $K_3PO_4$, and the balance being $H_2O$ (up to 100 weight percent).

11. The composition of claim 10, preferably comprising from about 48 to about 50 weight percent $CaCl_2$, from about 7.6 to about 9.1 weight percent $K_3PO_4$, with the balance being $H_2O$ (up to 100 weight percent).

12. The composition of claim 1, including a salt selected from the group consisting of sodium and strontium salts, wherein the anion of said sodium and/or strontium salt forms a substantially less soluble salt with calcium, said sodium and/or strontium salt being present in an amount sufficient to modify the $CaCl_2.6H_2O$ and potassium salt mixture to form an effectively congruently melting mixture.

13. The composition of claim 12, wherein said sodium and strontium salts are selected from the groups consisting of sodium arsenate; sodium metaborate; sodium citrate; sodium fluoride; sodium hydroxide; strontium hydroxide; sodium molybdate; sodium oxalate; sodium metaphosphate; sodium pyrophosphate; sodium silicate; sodium sulfite; sodium tartrate, and strontium tartrate.

14. The composition of claim 12 or 13, wherein the sodium salt is added to the hydrated $CaCl_2$ such that the sodim ion is present in an amount of from about 0.04 to about 2.0 percent by weight of the composition.

15. The composition of claim 12 or 13, wherein the strontium salt is added to the hydrated $CaCl_2$ such that the strontium ion is present in an amount of from about 0.05 to 2.0 percent by weight of the composition.

16. The composition of claim 1, including the addition of one or more nucleating agent or agents to said composition in an amount of from about 0.005 to about 2.0 weight percent to reduce supercooling to 5° C. or less during retrieval of the stored heat by crystallization.

17. The composition of claim 16, wherein the nucleating agent is present in an amount of from about 0.10 to about 1.0 weight percent.

18. The composition of claim 16 or 17, wherein the nucleating agent is selected from the group consisting of $Ba(OH)_2$, $BaO$, $BaI_2$, $BaSO_4$, $BaS_2O_3$, $BaCO_3$, $BaCl_2$, $BaF_2$, $BaF_2.HF$, $Sr(OH)_2$, $SrO$, $SrCO_3$, $SrF_2$ and $SrI_2$.

19. The composition of claim 18, wherein the nucleating agent is selected from $Ba(OH)_2$; $BaO$; $BaI_2$; $BaSO_4$; $BaCO_3$; $BaCl_2$ and $Sr(OH)_2$.

20. A reversible liquid/solid phase change composition comprising a mixture of $CaCl_2.6H_2O$ and a potassium salt whose anion forms a substantially less soluble salt with calcium, wherein the potassium ion is present in an amount sufficient to modify the semi-congruent melting behavior of $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$, and including a salt selected from the group consisting of sodium and strontium salts, wherein the anion of said sodium and/or strontium salt forms a substantially less soluble salt with calcium, said sodium and/or strontium salt being present in an amount sufficient to modify the $CaCl_2.6H_2O$ and potassium salt mixture to form an effectively congruently melting mixture.

21. The composition of claim 20, comprising $CaCl_2$ in an amount of from about 37 to about 51 weight percent and from about 0.5 to about 26 weight percent of the potassium salt, with the balance being $H_2O$ (up to 100 weight percent).

22. The composition of claim 20, wherein said sodium and strontium salts are selected from the group consisting of sodium arsenate; sodium metaborate; sodium citrate; sodium fluoride; sodium hydroxide; strontium hydroxide; sodium molybdate; sodium oxalate; sodium metaphosphate; sodium pyrophosphate; sodium silicate; sodium sulfite; sodium tartrate, and strontium tartrate.

23. The composition of claim 20, wherein the potassium ion is present in an amount of from about 0.2 to about 4.2 weight percent.

24. The composition of claim 20, comprising one or more nucleating agent in said composition in an amount of from about 0.005 to about 2.0 weight percent to reduce supercooling to 5° C. or less during retrieval of the stored heat by crystallization, wherein the nucleating agent is selected from the group consisting of $Ba(OH)_2$, $BaO$, $BaI_2$, $BaSO_4$, $BaS_2O_3$, $BaCO_3$, $BaCl_2$, $BaF_2$, $BaF_2.HF$, $Sr(OH)_2$, $SrO$, $SrCO_3$, $SrF_2$ and $SrI_2$.

25. A heat storage device comprising an encapsulating means having a reversible liquid/solid phase change composition hermetically sealed in said encapsulating means to prevent evaporation of water from the composition, said composition comprising an admixture of hydrated $CaCl_2$ and a potassium salt whose anion forms a substantially less soluble salt with calcium, wherein the potassium salt is added in an amount such that the potassium ion is present in an amount sufficient to modify the semi-congruent melting behavior or $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$.

26. The heat storage device of claim 25, wherein said composition includes a salt selected from the group consisting of sodium and strontium salts, wherein the anion of said sodium and/or strontium salt forms a substantially less soluble salt with calcium, said sodium and/or strontium salt being present in an amount sufficient to modify the $CaCl_2.6H_2O$ and potassium salt mixture to form an effectively congruently melting mixture.

27. The composition of claim 26, wherein said sodium and strontium salts are selected from the group consisting of sodium arsenate; sodium metaborate; sodium citrate, sodium fluoride; sodium hydroxide; strontium hydroxde; sodium molybdate; sodium oxalate; sodium metaphosphate; sodium pyrophosphate; sodium silicate; sodium sulfate; sodium tartrate, and strontium tartrate.

28. The heat storage device of claim 25 or 26, wherein said composition includes one or more nucleating agents in an amount of from about 0.005 to about 2.0 weight percent to reduce supercooling to 5° C. or less during retrieval of the stored heat by crystallization, said nucleating agents being selected from $Ba(OH)_2$, $BaO$, $BaI_2$, $BaSO_4$, $BaS_2O_3$, $BaCO_3$, $BaCl_2$, $BaF_2$, $BaF_2.HF$, $Sr(OH)_2$, $SrO$, $SrCO_3$, $SrF_2$ and $SrI_2$.

29. A method of storing heat, comprising the steps of preparing a reversible liquid-solid phase change composition by admixing hydrated $CaCl_2$ and a potassium salt whose anion forms a substantially less soluble salt with calcium, adding said potassium salt in an amount sufficient to modify the semi-congruent melting behavior of $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$, introducing the composition into an encapsulating means for use as a heat storage device, and hermetically sealing the encapsulating means to prevent evaporation of water from the composition.

30. The method of claim 29, including the step of adding an amount of a salt selected from the group consisting of sodium and strontium salts, wherein the anion of said sodium and/or strontium salt forms a substantially less soluble salt with calcium, said sodium and/or strontium salt being present in an amount sufficient to modify the $CaCl_2.6H_2O$ and potassium salt mixture to form an effectively congruently melting mixture.

31. The method of claim 29 or 30, including the step of adding one or more nucleating agents in said composition in an amount of from about 0.005 to about 2.0 weight percent to reduce supercooling to 5° C. or less during retrieval of the stored heat by crystallization, said nucleating agents being selected from $Ba(OH)_2$, $BaO$, $BaI_2$, $BaSO_4$, $BaS_2O_3$, $BaCO_3$, $BaCl_2$, $BaF_2$, $BaF_2.HF$, $Sr(OH)_2$, $SrO$, $SrCO_3$, $SrF_2$ and $SrI_2$.

* * * * *